Aug. 10, 1954  L. G. JOHNSON  2,685,742
DEPTH FINDER

Filed July 3, 1952  2 Sheets-Sheet 1

Leonard G. Johnson
INVENTOR.

BY
*Clarence A. O'Brien*
*and Harvey B. Jacobson*
Attorneys

Aug. 10, 1954 — L. G. JOHNSON — 2,685,742
DEPTH FINDER

Filed July 3, 1952 — 2 Sheets-Sheet 2

Leonard G. Johnson
INVENTOR.

BY *Clarence A. O'Brien
and Harvey B. Jacobson*
Attorneys

Patented Aug. 10, 1954

2,685,742

UNITED STATES PATENT OFFICE 2,685,742

DEPTH FINDER

Leonard G. Johnson, Fergus Falls, Minn.

Application July 3, 1952, Serial No. 297,019

1 Claim. (Cl. 33—126.5)

This invention relates to new and useful improvements in depth finders and the primary object of the present invention is to provide a small and compact depth finding device that may be carried in a fishing kit for use in determining fishing holes and the like in a convenient manner.

Another important object of the present invention is to provide a depth finder including a line-holding spool whose shaft journally supports a peripherally graduated disc that will rotate as its operating mechanism is actuated by spaced lugs on a line about the spool to indicate the amount of line played off the spool and hence the depth of a body of water into which the line is dropped.

A further object of the present invention is to provide a depth finder of the aforementioned character involving a casing having three compartments, one of which houses the spool, another of which houses the drive mechanism for the spool and the remaining of which houses the disc actuating mechanism.

A still further aim of the present invention is to provide a depth finder that is extremely simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 4 is a fragmentary vertical sectional view taken substantially on the plane of section line 4—4 of Figure 2;

Figure 7 is a group perspective view of the finding cord and stop lug used therewith.

Figure 1:
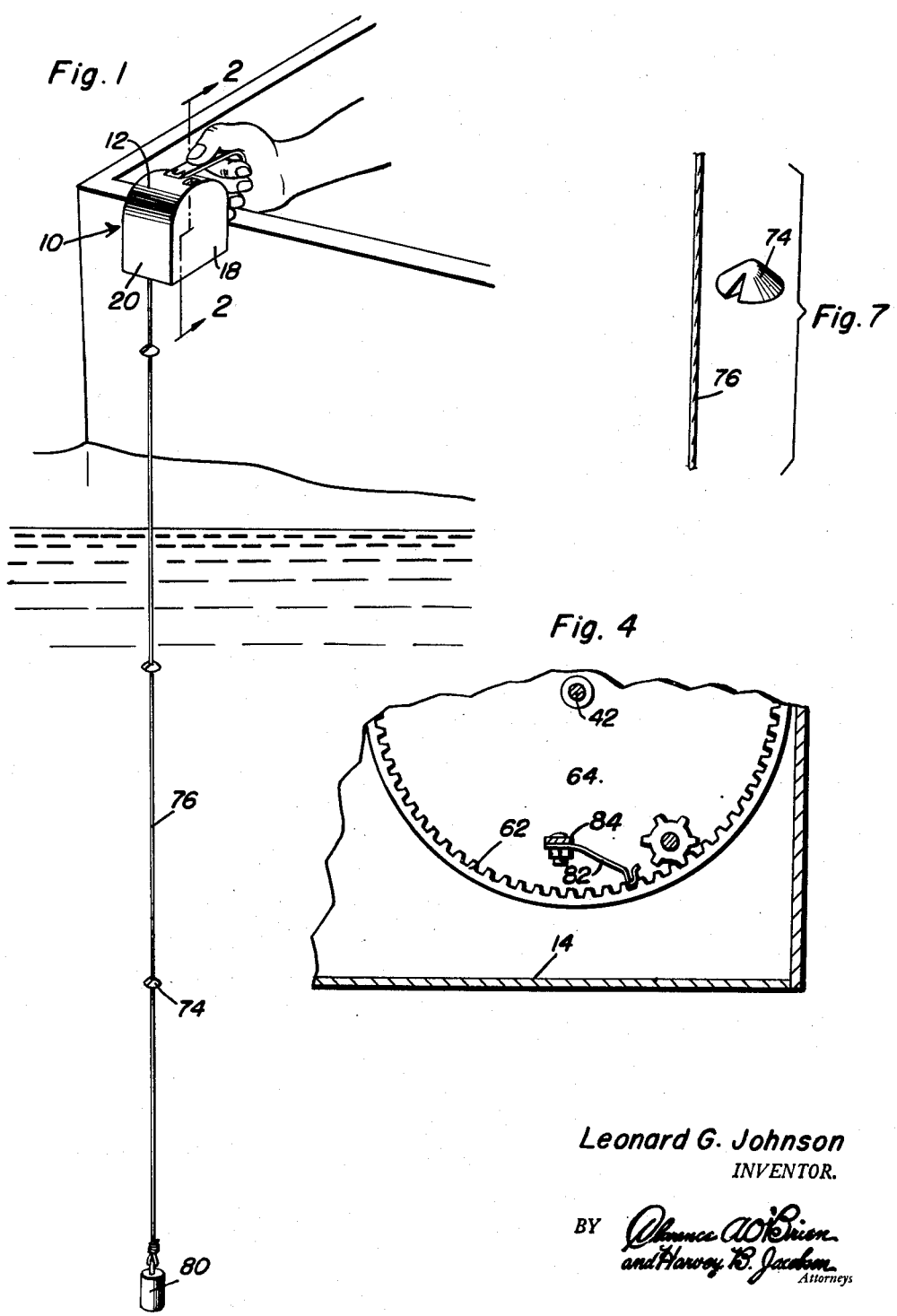
Figure 1 is a fragmentary perspective view showing the invention in use.
Figure 2:
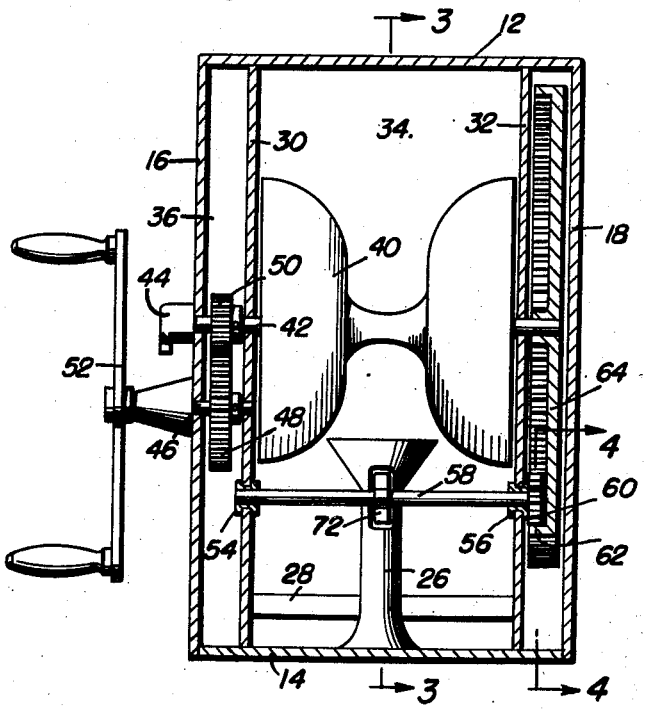
Figure 2 is an enlarged vertical sectional view taken substantially on the plane of section line 2—2 of Figure 1.
Figure 5:
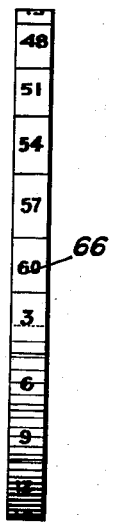
Figure 5 is an edge view of the depth indicating disc used in the invention.
Figure 3:
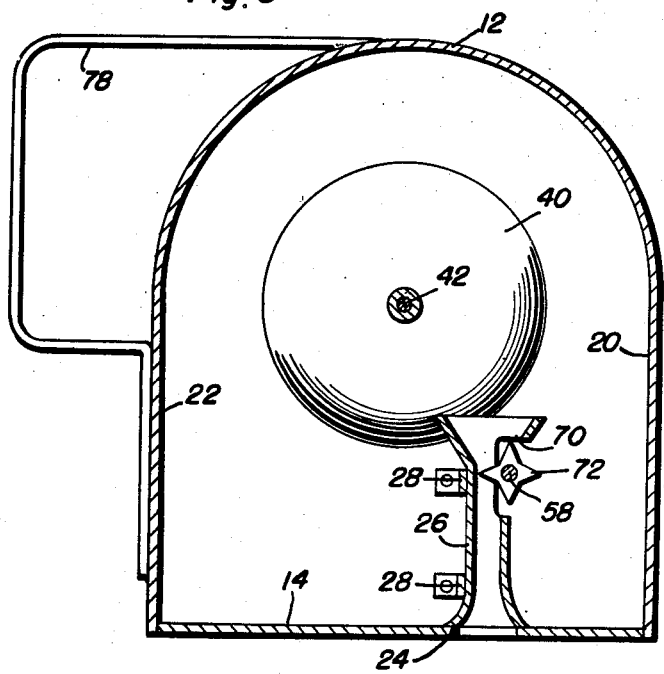
Figure 3 is a vertical sectional view taken substantially on the plane of section line 3—3 of Figure 2.
Figure 6:
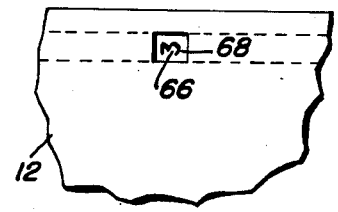
Figure 6 is a fragmentary plan view of Figure 1.

Referring now to the drawings in detail, wherein for the purpose of illustration, there is disclosed a preferred embodiment of the present invention, the numeral 10 represents a casing having a rounded upper wall 12, a flat bottom wall 14 and spaced side walls 16 and 18. The upper wall 12 is formed at its ends with end walls 20 and 22 that connect the side walls to each other and to the bottom wall.

Bottom wall 14 is formed with a central opening 24 over which there is supported a vertical guide funnel or tube 26 having supporting brackets 28 that are attached to vertical partitions 30 and 32. The upper and lower ends of the partitions are secured against the upper and lower walls 12 and 14, and the vertical edges of the partitions are secured to the walls 20 and 22 to form an intermediate compartment 34 between the partitions and a pair of side compartments 36 and 38 between the side walls 16, 18 and the partitions 30 and 32.

A spool 40 is located in the compartment 34 and includes a supporting shaft 42 that extends through apertures in the partitions 30 and 32. One end of shaft 42 extends through the side wall 16 and carries a finger grip 44, whereby the spool may be held against rotation.

The partition 30 and the wall 16 rotatably support a short shaft 46 upon which there is fixed a gear 48 that meshes with a gear 50 on shaft 42. Both gears 48 and 50 are located within compartment 36. A hand grip 52 is secured to the outer end of shaft 46 to form a means whereby the spool may be rotated.

Bearings 54 and 56 are fitted in apertures in the partitions 30 and 32, and the bearings rotatably support a shaft 58. The end of shaft 58 that extends into compartment 38 supports a pinion 60 that meshes with the internally toothed peripheral flange 62 of a disk 64. Graduations 66 are provided on the outer face of flange 62 for selectively registering with an opening 68 in the top wall 12.

Shaft 58 extends horizontally through a slot 70 in the funnel 26 below the upper outwardly flared end of the funnel. A spider member or ratchet 72 is secured to shaft 58 and extends into the funnel through slot 70 to be engaged by spaced lugs 74 secured to a line 76 wound about the spool.

A U-shaped handle 78 is fixed to the outer surface of the casing 10 so that the opening defined by the handle may accommodate the first and middle fingers of a user's hand, the user's thumb will rest upon the upper leg of the handle 78 and the user's ring finger and little finger will be disposed below the lower leg of the handle.

In practical use of the invention, as the sinker 80 and line 76 are dropped the lugs 74 will sequentially engage spider member 72 to rotate the same and also pinion 60. The pinion being in mesh with the ring gear 62 will drive the latter to bring the graduation 66 in registry with the opening 68, thereby indicating the depth of the sinker. The line may be rewound on the spool as the handle 52 is manually rotated.

A spring pawl 82 is secured as at 84 to the partition wall 32 and engages the teeth of ring gear 62 to permit controlled rotation of the ring gear in a smooth manner.

Having described the invention, what is claimed as new is:

A depth finder comprising a casing having a bottom wall with an opening and a pair of vertical partitions dividing the casing into a central compartment and a pair of side compartments, a shaft extending through and rotatably supported by said partitions, a spool keyed on the shaft, a line wound on the spool and having spaced lugs thereon, a peripherally graduated disc journaled on the shaft and disposed in one of the side compartments, a hand grip rotatable on the casing, gearing in the other side compartment operatively connecting the hand grip to the shaft to permit rotation of the spool by the hand grip, a funnel supported on the bottom wall over the opening and under the spool, a second shaft rotatably supported by the partitions and paralleling the first named shaft, means operatively connecting the second shaft to the disc for rotation of the latter with the former, said funnel having a slot receiving the second shaft, and a spider member fixed on the second shaft and disposed within the slot to be engaged by the spaced lugs on said line extending from the spool and through the funnel.

References Cited in the file of this patent

UNITED STATES PATENTS

| Number | Name | Date |
|---|---|---|
| 45,131 | Beaton | Nov. 22, 1864 |
| 197,800 | Schrom | Dec. 4, 1877 |
| 900,351 | Brown | Oct. 6, 1908 |
| 968,034 | Du Shane | Aug. 23, 1910 |
| 1,123,545 | Johnson | Jan. 5, 1915 |
| 1,533,981 | Fickert | Apr. 14, 1925 |

FOREIGN PATENTS

| Number | Country | Date |
|---|---|---|
| 6,884 | Great Britain | 1895 |
| 116,021 | Sweden | Mar. 12, 1946 |